United States Patent
Alman et al.

(10) Patent No.: US 9,601,081 B2
(45) Date of Patent: Mar. 21, 2017

(54) PROCESS FOR DISPLAYING AND DESIGNING COLORS

(71) Applicant: AXALTA COATING SYSTEMS IP CO., LLC, Wilmington, DE (US)

(72) Inventors: David H. Alman, Royal Oak, MI (US); David Lee Griffus, Grand Blanc, MI (US); Robert Vincent Canning, Jr., Bear, DE (US); Mary C. Slayton, White Lake, MI (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 170 days.

(21) Appl. No.: 14/350,624

(22) PCT Filed: Oct. 28, 2012

(86) PCT No.: PCT/US2012/062348
§ 371 (c)(1),
(2) Date: Apr. 9, 2014

(87) PCT Pub. No.: WO2013/063552
PCT Pub. Date: May 2, 2013

(65) Prior Publication Data
US 2014/0253610 A1   Sep. 11, 2014

Related U.S. Application Data

(63) Continuation of application No. PCT/US2012/062337, filed on Oct. 28, 2012, which
(Continued)

(51) Int. Cl.
*H04N 21/60* (2011.01)
*G09G 5/06* (2006.01)
(Continued)

(52) U.S. Cl.
CPC .............. *G09G 5/026* (2013.01); *G01J 3/462* (2013.01); *G01J 3/463* (2013.01); *G01J 3/52* (2013.01);
(Continued)

(58) Field of Classification Search
None
See application file for complete search history.

(56) References Cited

U.S. PATENT DOCUMENTS 3,690,771 A     9/1972  Armstrong, Jr. et al.
6,976,328 B1 *  12/2005 Goller ...................... G09F 5/00
                                                            40/124.01
(Continued)

FOREIGN PATENT DOCUMENTS

WO   2008121358 A1   10/2008
WO   2008150378 A1   12/2008
WO   2009009672 A1    1/2009

OTHER PUBLICATIONS

ISA Korean Intellectual Property Office, International Search Report and Written Opinion for International Application No. PCT/US2012/062348, mailed Feb. 25, 2013.
(Continued)

*Primary Examiner* — Ryan M Gray
(74) *Attorney, Agent, or Firm* — Lorenz & Kopf LLP

(57) ABSTRACT

The present disclosure is directed to a system for displaying and designing one or more colors on digital display devices, non-digital display media, or a combination thereof. The system can comprise one or more comparative colors, background colors, or a combination thereof for improved color visual comparison. The system can be used for comparing and selecting colors, such as for use in fashion color designs, automotive color designs, architecture color designs, appliance color designs, or a combination thereof. This disclosure
(Continued)

is further directed to a kit and a method for displaying and producing one or more colors.

20 Claims, 6 Drawing Sheets

Related U.S. Application Data is a continuation of application No. PCT/US2012/062338, filed on Oct. 28, 2012.

(60) Provisional application No. 61/552,733, filed on Oct. 28, 2011, provisional application No. 61/552,713, filed on Oct. 28, 2011, provisional application No. 61/552,726, filed on Oct. 28, 2011.

(51) Int. Cl.
*G09G 5/02* (2006.01)
*G01J 3/46* (2006.01)
*G01J 3/52* (2006.01)
*H04N 1/60* (2006.01)

(52) U.S. Cl.
CPC ............ G09G 5/06 (2013.01); H04N 1/6011 (2013.01); H04N 1/6033 (2013.01); *G09G 2340/12* (2013.01); *G09G 2380/00* (2013.01)

(56) References Cited

U.S. PATENT DOCUMENTS

| | | | |
|---|---|---|---|
| 7,106,343 B1 | 9/2006 | Hickman | |
| 7,639,255 B2 | 12/2009 | Steenhoek | |
| 7,743,055 B2 | 6/2010 | Rodrigues et al. | |
| 7,747,615 B2* | 6/2010 | Rodrigues | G01J 3/46 707/706 |
| 7,991,596 B2 | 8/2011 | Steenhoek | |
| 8,049,926 B2* | 11/2011 | Hayward | H04N 1/6033 358/1.9 |
| 2001/0007505 A1 | 7/2001 | Lee et al. | |
| 2007/0035554 A1 | 2/2007 | McClanahan | |
| 2007/0291312 A1 | 12/2007 | Kaneko et al. | |
| 2008/0147348 A1 | 6/2008 | Lewis | |
| 2009/0235946 A1* | 9/2009 | Kalla | A45D 44/005 132/200 |
| 2009/0295823 A1* | 12/2009 | Henry | G01J 3/46 345/593 |
| 2010/0045987 A1* | 2/2010 | Bonikowski | B41F 33/0036 356/402 |
| 2010/0085587 A1 | 4/2010 | Hayward et al. | |
| 2010/0194776 A1* | 8/2010 | Chong | G06Q 30/06 345/594 |
| 2012/0170836 A1* | 7/2012 | Henry | G01J 3/52 382/162 |
| 2012/0236309 A1* | 9/2012 | Krause | G01J 3/463 356/402 |

OTHER PUBLICATIONS

European Patent Office, Partial Supplementary European Search Report for Application No. 12842708.5, dated Mar. 24, 2015.
CIPO, Chinese Office Action issued in Application No. 201280064728.X, dated May 4, 2016.

\* cited by examiner

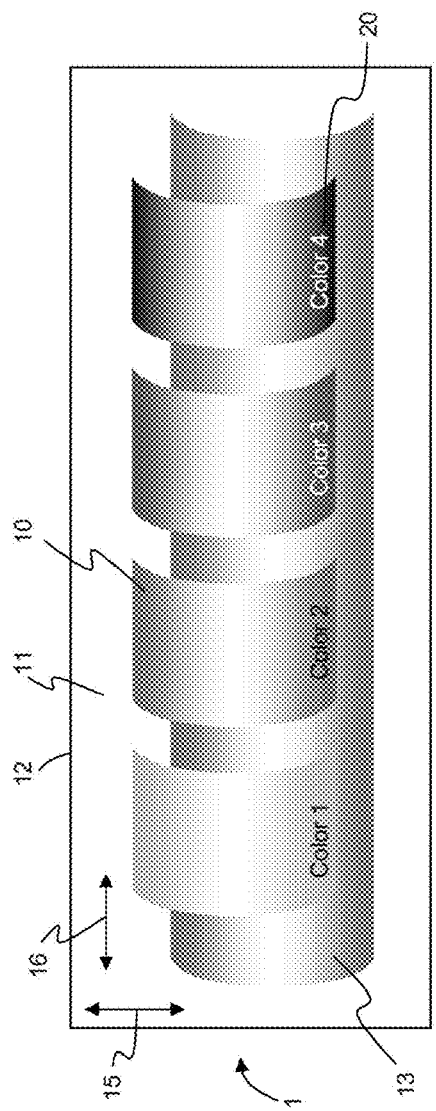
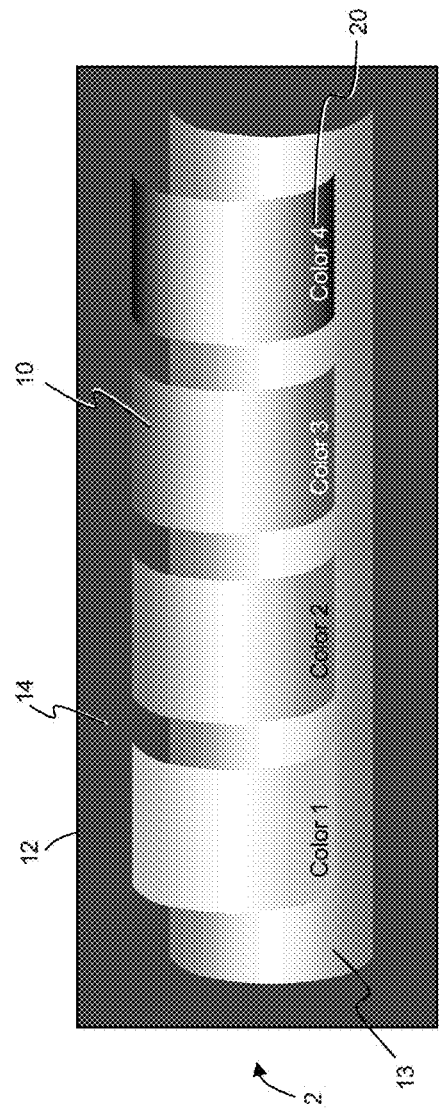
FIG. 1A
FIG. 1B

PROCESS FOR DISPLAYING AND DESIGNING COLORS

CROSS-REFERENCE TO RELATED APPLICATION

This application is a U.S. National-Stage entry under 35 U.S.C. § 371 based on International Application No. PCT/US2012/062348, filed Oct. 28, 2012 which was published under PCT Article 21(2) and which claims priority to U.S. Provisional Application No. 61/552,733, filed Oct. 28, 2011, and to International Application No. PCT/US2012/062337, filed Oct. 28, 2012, which claims priority to U.S. Provisional Application No. 61/552,713, filed Oct. 28, 2011, and to International Application No. PCT/US2012/062338, filed Oct. 29, 2012, which claims priority to U.S. Provisional Application No. 61/552,726, filed Oct. 28, 2011, which are all hereby incorporated in their entirety by reference.

TECHNICAL FIELD

The present disclosure is directed to a process for displaying and producing one or more colors. This disclosure is particularly directed to a process for displaying one or more colors on digital display devices, non-digital display media, or a combination thereof, for visual comparison, selection and modification of colors.

BACKGROUND

Various colors are used in, for example, clothing, fashion, architectures, automobiles, and appliances, etc. Colors can be produced using one or more colorants that can comprise dyes, pigments, or a combination thereof. For example, fabrics can be produced into colors by staining with dyes or pigments. Color prints or photos can be produced with inks comprising dyes and pigments. Surface coatings, such as the coatings for automobiles, architectures, or appliances, can be produced using coating compositions comprising dyes, pigments including effect pigments, such as light absorbing pigments, light scattering pigments, light interference pigments, and light reflecting pigments.

Traditionally, for color development, color design, and color matching, a number of color products are produced on one or more display media, such as on paper, cloth, or plastic using colorants. The color products are then compared visually. For changing or modifying colors, more color products are repeatedly produced and compared until one or more desired target colors are obtained. Such traditional process requires the consumption of significant materials, efforts and time.

With the development of digital color display technologies, colors can now be displayed on digital display devices, such monitors or computer screens. However, color differences are difficult to distinguish visually.

Thus, it is desirable to provide better color display processes. In addition, other objects, desirable features and characteristics will become apparent from the subsequent summary and detailed description, and the appended claims, taken in conjunction with the accompanying drawings and this background.

SUMMARY

According to an exemplary embodiment, a system for displaying and producing one or more colors is provided. The system comprises:

A1) one or more display devices comprising one or more digital display devices;
A2) a computing device functionally coupled to the one or more digital display devices;
A3) one or more input devices functionally coupled to the computing device, the one or more digital display devices, or a combination thereof;
A4) a color database functionally coupled to the computing device, the color database comprises a plurality of interrelated color characteristics and color identifiers; and
A5) a computing program product stored on a first digital storage medium functionally coupled to the computing device, the computing program product comprises computing program codes for:
  B1) receiving a color selection input from the input devices for selecting a first set of specimen colors;
  B2) retrieving from the color database first color characteristics for each of the first set of specimen colors;
  B3) generating a first background color based on a first background selection input or based on a predetermined first background color scheme;
  B4) generating a first display pattern comprising positioning data for positioning the first background color and each of the first set of specimen colors over the first background color within a first background area;
  B5) generating first color display values of a first display product, the first color display values are generated based on at least the first color characteristics, the first display pattern, and the first background color; and
  B6) displaying the first display product on the one or more display devices based on the first color display values.

In another exemplary embodiment, the disclosure is further directed to a color display kit comprising:
i) one or more digital data storage media comprising computing codes for:
  ia) a color database, access connection data for accessing the color database, or a combination thereof, the color database comprises a plurality of interrelated color characteristics and color identifiers; and
  ib) a computing program product that comprises computing program codes for:
  D1) receiving a color selection input from one or more input devices for selecting a first set of specimen colors;
  D2) retrieving from the color database first color characteristics based on the first set of specimen colors;
  D3) generating a first background color based on a first background selection input or based on a predetermined first background color scheme;
  D4) generating a first display pattern comprising positioning data for positioning the first background color and each of the first set of specimen colors over the first background color within a first background area;
  D5) generating first color display values of a first display product, the first color display values are generated based on at least the first color characteristics, the first display pattern, and the first background color; and
  D6) displaying the first display product on one or more display devices based on the color display values.

In accordance with another exemplary embodiment, a process for displaying and producing one or more colors is provided. The process comprises the steps of:

E1) selecting a first set of specimen colors;

E2) obtaining first color characteristics for each of the first set of specimen colors;

E3) providing a first background color;

E4) providing a first comparative color;

E5) generating a first display pattern comprising positioning data for positioning the first background color, each of the first set of specimen colors, the first comparative color, over the first background color within a first background area, the first comparative color is displayed interlaced with at least one of the first set of specimen colors over the first background color at a first comparing position within the first background area;

E6) generating first color display values of the first display product, the first color display values are generated at least based on the first color characteristics, the first display pattern, the first comparative color and the first background color; and E7) displaying the first display product on the one or more display devices based on the first color display values;

wherein the one or more display devices comprise one or more digital display devices.

BRIEF DESCRIPTION OF DRAWINGS

The present invention will hereinafter be described in conjunction with the following drawing figures, wherein like numerals denote like elements, and wherein:

FIGS. 1A through 1D show examples of display products having a set of colors and a comparative color at one or more viewing angles or illumination angles with a first background color (FIG. 1A), a subsequent background color (FIG. 1B), the comparative color at one comparative position (FIGS. 1A and 1B) and a different comparative position (FIGS. 1C and 1D).

DETAILED DESCRIPTION

Figure 1C:
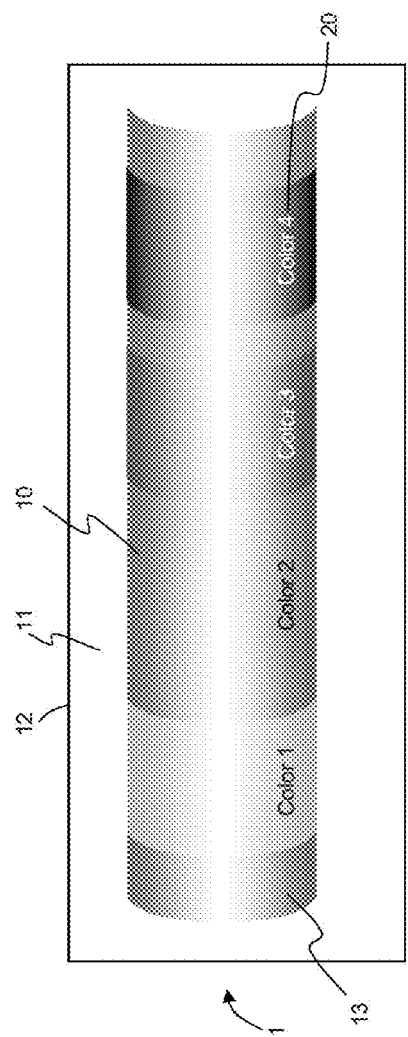

The following detailed description is merely exemplary in nature and is not intended to limit the invention or the application and uses of the invention. Furthermore, there is no intention to be bound by any theory presented in the preceding background of the invention or the following detailed description.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein,

The term "dye" means a colorant or colorants that produce color or colors and is usually soluble in a composition.

The term "pigment" or "pigments" used herein refers to a colorant or colorants that produce color or colors and is usually not soluble in a composition, such as a coating composition. A pigment can be from natural and synthetic sources and made of organic or inorganic constituents. A pigment can also include effect pigment such as metallic particles or flakes with specific or mixed shapes and dimensions.

The term "effect pigment" or "effect pigments" refers to pigments that produce special effects, such as in a coating. Examples of effect pigments can include, but not limited to, light absorbing pigment, light scattering pigments, light interference pigments, and light reflecting pigments. Metallic flakes, for example aluminum flakes, can be examples of such effect pigments. The term "gonioapparent flakes", "gonioapparent pigment" or "gonioapparent pigments" refers to pigment or pigments pertaining to change in color, appearance, or a combination thereof with change in illumination angle or viewing angle. Metallic flakes, such as aluminum flakes are examples of gonioapparent pigments. Interference pigments or pearlescent pigments can be further examples of gonioapparent pigments.

"Appearance" used herein refers to (1) the aspect of visual experience by which a surface, such as a coating is viewed or recognized; and (2) perception in which the spectral and geometric aspects of a surface such as a coating is integrated with its illuminating and viewing environment. In general, appearance can include shape, texture, sparkle, glitter, gloss, transparency, opacity, other visual effects of a coating, or a combination thereof. Appearance can vary with varying viewing angles, varying illumination angles, or a combination thereof.

The term "texture", "textures", or "texture of coating" refers to coating appearances that are resulted from the presence of flakes or other effect pigment or pigments in a coating composition. The flakes can include, such as, metallic flakes like aluminum flakes, coated aluminum flakes, interference pigments, like mica flakes coated with metal oxide pigments, such as, titanium dioxide coated mica flake or iron oxide coated mica flake, diffractive flakes, such as, vapor deposited coating of a dielectric over finely grooved aluminum flakes. For digital display, the texture of a coating can be represented with a texture function generated statistically by measuring the pixel intensity distribution of an image of the coating captured by a digital imaging device. The texture function can be used to generate an image of the coating by duplicating those pixel intensity statistics in the image. The texture function of a coating can also be generated based on color data and sparkle values of the coating.

The term "sparkle", "sparkles", "sparkling" or "sparkle effect" refers to the visual contrast between the appearance of highlights on particles of gonioapparent pigments and their immediate surroundings. Sparkle can be defined by, for example, ASTM E284-90 and other standards or methods.

The term "flop" refers to a difference in appearance of a material viewed over two widely different aspecular angles. As used herein, the term "flop value", "flop values" or "flop index" refers to a numerical scale of flop obtained by instrumental or visual experiments, or derived from calculations based on color data. In one example, flop index can be defined by ASTM E284 or other standards or methods.

The term "database" refers to a collection of related information that can be searched and retrieved. The database can be a searchable electronic numerical or textual document, a searchable PDF document, an Microsoft Excel® spreadsheet, an Microsoft Access® database (both supplied by Microsoft Corporation of Redmond, Wash.), an Oracle® database (supplied by Oracle Corporation of Redwood Shores, Calif.), or a Lynux database, each registered under their respective trademarks. The database can be a set of electronic documents, photographs, images, diagrams, or drawings, residing in one or more computer readable storage media that can be searched and retrieved. A database can be a single database or a set of related databases or a group of unrelated databases. "Related database" means that there is at least one common information element in the related databases that can be used to relate such databases. One example of the related databases can be Oracle® relational databases. In one example, a color database can comprise color characteristics and color identifiers. In another example, a color database can comprise appearance characteristics, sparkle values and related measurements, coating formulations, vehicle data, or a combination thereof.

The term "vehicle", "automotive", "automobile", "automotive vehicle", or "automobile vehicle" refers to an automobile such as car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport that are coated with coating compositions.

A computing device used herein can refer to a data processing chip, a desktop computer, a laptop computer, a pocket PC, a personal digital assistant (PDA), a handheld electronic processing device, a smart phone that combines the functionality of a PDA and a mobile phone, or any other electronic devices that can process information automatically. A computing device can be built into other electronic devices, such as a built-in data processing chip integrated into an imaging device, color measuring device, or an appearance measuring device. A computing device can have one or more wired or wireless connections to a database, to another computing device, or a combination thereof. A computing device can be a client computer that communicates with a host computer in a multi-computer client-host system connected via a wired or wireless network including intranet and internet. A computing device can also be configured to be coupled with a data input or output device via wired or wireless connections. For example, a laptop computer can be operatively configured to receive color data and images through a wireless connection. A "portable computing device" includes a laptop computer, a pocket PC, a personal digital assistant (PDA), a handheld electronic processing device, a mobile phone, a smart phone that combines the functionality of a PDA and a mobile phone, a tablet computer, or any other electronic devices that can process information and data and can be carried by a person.

Wired connections can include hardware couplings, splitters, connectors, cables or wires. Wireless connections and devices can include, but not limited to, Wi-Fi device, Bluetooth device, wide area network (WAN) wireless device, local area network (LAN) device, infrared communication device, optical data transfer device, radio transmitter and optionally receiver, wireless phone, wireless phone adaptor card, or any other devices that can transmit signals in a wide range of radio frequency including visible or invisible optical wavelengths and electromagnetic wavelengths.

The term "display device" refers to a device that can display colors or an image of a color or colors. The display device can comprise a digital display device and non-digital display media, such as one or more display media selected from paper, plastic, glass, metal, wood, natural polymers, synthetic polymers, or a combination thereof. The digital display device can be a computer monitor, a projector, a TV screen, a tablet, a personal digital assistant (PDA) device, a cell phone, a smart phone that combines PDA and cell phone, an iPod, an iPod/MP Player, a flexible thin film display, a high dynamic range (HDR) image display device, a low dynamic range (LDR), a standard dynamic range (SDR) display device, or any other display devices that can display information or images based on digital signals. The display device can also be a printing device that prints, based on digital signals, information or image onto papers, plastics, textiles, or any other surfaces that are suitable for printing the information or images onto. The display device can also be a multi-functional display/input/output device, such as a touch screen.

This disclosure is directed to a system for displaying and producing one or more colors. The system can comprise:

A1) one or more display devices comprising one or more digital display devices;

A2) a computing device functionally coupled to said one or more digital display devices;

A3) one or more input devices functionally coupled to said computing device, said one or more digital display devices, or a combination thereof;

A4) a color database functionally coupled to said computing device, said color database comprises a plurality of interrelated color characteristics and color identifiers; and A5) a computing program product stored on a first digital storage medium functionally coupled to said computing device, said computing program product comprises computing program codes for:

B1) receiving a color selection input from said input devices for selecting a first set of specimen colors;

B2) retrieving from said color database first color characteristics for each of said first set of specimen colors;

B3) generating a first background color based on a first background selection input or based on a predetermined first background color scheme;

B4) generating a first display pattern comprising positioning data for positioning said first background color and each of said first set of specimen colors over said first background color within a first background area;

B5) generating first color display values of a first display product, said first color display values are generated based on at least said first color characteristics, said first display pattern, and said first background color; and B6) displaying said first display product on said one or more display devices based on said first color display values.

The system can be operated by an operator, such as using the input devices to enter inputs and the computing device to perform the steps programmed by the computing program codes. The entire computing program codes or parts thereof can be installed in the computing device or as otherwise described herein. The aforementioned display devices and computing devices can be suitable. The color database can further comprise a plurality of color formulas interrelated to the plurality of color characteristics and color identifiers.

The computing program product and the color database can reside on the computing device, on a remote computer server and accessed from the computing device, or a combination thereof. The computing program product or a portion of the computing program product, the color database or a portion of the color database, can reside on the remote computer server and can be accessed from the computing device via a network connection selected from a wired connection, a wireless connection, or a combination thereof. In one example, the computing program product can be installed on a computer and can access the color database residing on a remote computer server via internet. In another example, the computing program product and the color database can be installed on a computer. In yet another example, the computing program product and the color database are residing on a remote computer server and can be accessed from the computing device via a network.

Color can be defined by color characteristics that can comprise well known L,a,b color values, L*,a*,b* color values, XYZ color values, L,C,h color values, spectral reflectance values, light absorption (K) and scattering (S) values (also known as "K,S values"), or a combination thereof. The color characteristics can also comprise other color values such as Hunter Lab color values, ANLAB color values, CIE LAB color values, CIE LUV color values, L*,C*,H* color values, any other color values known to or developed by those skilled in the art, or a combination thereof.

The color selection input can be provided by the operator and received by the computing device from an input device coupled to the computing device such as a keyboard, a mouse, a touch screen, or a combination thereof. The selection input can also be provided by the operator by selecting one or more articles such as one or more pieces of paper or other display media, a vehicle or vehicle parts that have the specimen colors. The specimen color can be converted into digital color values if the original specimen color is not in digital form. In one example, the specimen colors can be one or more colors printed on color photo papers. In another example, the specimen colors can be from one or more parts of a vehicle and can be measured using a color measurement device to obtain spectra or color data. In yet another example, the specimen colors can be one or more colors displayed on a computer screen. In yet another example, the specimen colors can be from one or more fabrics.

Once the specimen colors are selected, they can be displayed on the one or more digital display devices. This can be done by converting color data associated with the specimen colors into color display values that can be displayed on the digital display devices. In one example, color characteristics associated with the specimen colors, such as L,a,b color values, or L*,a*,b*, values can be converted to corresponding XYZ color values, and calculating corresponding R,G,B color values from the corresponding XYZ values. The R,G,B color values can then be displayed on the digital display devices. The R,G,B color values can further be modified or calibrated to fit various display devices. In another example, color characteristics interrelated with the specimen colors can be retrieved from the color database based on the color identifiers and then converted to color display values.

The specimen colors, or any other colors described herein, can also be displayed onto non-digital display media, such as paper. For example, the specimen colors, the background colors, the comparative colors, or a combination thereof, can be converted into CMYK color values comprising cyan, magenta, yellow, and key (black) values for printing using a four-ink printing system and can then be printed onto paper, plastic or other display media. Digital display can be preferred.

The computing program product can further comprise computing program codes for automatically selecting all of the first set of specimen colors based on predetermined selection criteria if the color selection input is only selecting part of the first set of specimen colors. The predetermined selection criteria can define the number of colors in a range of from 1 to 50 in one example, 2 to 40 in another example, and 2 to 30 in yet another example. The predetermined selection criteria can define the colors to be similar or different in at least one aspect of the color values. In one example, when a green color is selected, the computing program product can automatically select the first set of specimen colors having 2 to 20 colors similar green colors. In another example, the computing program product can automatically select the first set of specimen colors having 2 to 30 colors contrast to the green color. In yet another example, the computing program product can automatically select the first set of specimen colors having 2 to 15 colors that can be in harmony with the green color. In yet another example, a color selection input can be received from a mouse functionally coupled to the computing device that selects one blue color. The computing program product can automatically select a plurality of colors that are similar or different to the blue color selected. The first set of specimen colors can have at least one different value in the color data values, such as at least one different value in L*, a*, b*, chroma, hue, or a combination thereof. For example, the first set of specimen colors can have same colors in different lightness, or different colors in same or different lightness. The predetermined selection criteria can be different depending on purposes. For example, when color match is the purpose, the predetermined selection criteria can select similar colors. When color contrast or harmony is desired, the predetermined selection criteria can select contrast colors or harmony colors, respectively.

As used herein, different colors mean colors having visual differences or perceived visual differences, differences in color characteristics, any of aspects or subset or color characteristics, or a combination thereof. The term "same color" refers to colors having no visual differences. For example, the colors can different in lightness (L or L*), differences in red/magenta and green (a or a*), differences in yellow and blue (b or b*), in CIELAB color space system; or lightness (L), chroma (C), hue angle (h). The colors can also be different when viewed at different illumination angles, different viewing angles, or a combination thereof. The colors can further be different in textures, for example sparkles imparted by one or more effect pigments in coatings.

The first background color can be different from each of the first set of specimen colors. The first background color can be selected from a first light color having a first light color value, a first dark color having a first dark color value, a first gradient color having first gradient color values varying continuously or incrementally from the first light color value to the first dark color value, or a combination thereof. The first light color and the first dark color are different. In one example, a white background color can be used. In another example, a black background color can be used. In another example, a grey background color can be used. In yet another example a gradient color varying from white to dark grey can be used as background color. In further example, a gradient background color can have a first light color lighter than any of the first set of specimen colors. In further example, a gradient background color can have a first dark color darker than any of the first set of specimen colors.

The colors can be displayed in defined shapes or areas, such as rectangles, triangles, squares, circles, polygons, irregular shapes, or a combination thereof, and can be bordered with lines or trims, or borderless. In one example, colors can be displayed on paper by pasting colored paper squares onto a background medium such as a piece of paper having a background color. In another example, colors can be displayed on a computer screen in borderless squares for easy comparison of colors.

The first display pattern can comprise positioning data for positioning the colors in defined shapes within the first background area.

The first color display values can comprise R,G,B color values based on the first color characteristics and the first background color. The R,G,B color values can be used to display the first display product on digital display devices. The first color display values can also comprise other color values, such as CMYK color values for printing the first display product onto a non-digital medium, such as paper, plastic, cloth, etc.; percentage values or ratio values of pigments or dyes for producing the color display product on a non-digital medium; positioning values for depositing certain pigments or dyes at a particular position; position values for display particular R,G,B color values at particular positions on a digital display; or a combination thereof.

The first display product can further comprise a first comparative color. The first comparative color can be selected by the operator or generated by the computing device through a computing program. The computing program product can further comprise computing program codes for:

B7) generating the first comparative color based on a first comparative color selection input or a predetermined first comparative color scheme; and B8) displaying the first comparative color at a default first comparative color position or a first comparing position based on a first comparative color positioning input received from the input devices, the first comparative color is displayed interlaced with at least one of the first set of specimen colors over the first background color at the first comparing position within the first background area.

The comparative color can be movable based on the input, such as dragged by a mouse coupled to the computing device. The default position can be any place on the background area and not necessary to be interlaced with any specimen colors. By interlacing the comparative color with the specimen colors, colors can be better compared. The first comparative color can be any color selected by the operator or predetermined and programmed into a computing program product. The first comparative color can be selected from the first set of specimen colors. One of the benefits of selecting the comparative color from the specimen can be that when the comparative color is interlaced with the specimen color, color difference can be visually indistinguishable. In one example, the comparative color can be moved by the operator using a computer mouse and positioned so that the comparative color can be interlaced with two or more of the specimen colors at same time. In another example, the comparative color can be displayed interlaced with two or more of the specimen colors at a plurality of comparing positions sequentially. The plurality of comparing positions can be controlled by an operator by using a control device such as a mouse functionally coupled to the computing device or by entering positioning input coordinates into the computing device. The plurality of comparing positions can be automatically controlled by programming the positioning input coordinates into a computing program.

The display product can further comprise a subsequent comparative color. The subsequent comparative color can be selected by the operator or generated by the computing device through a computing program. The aforementioned computing program product can further comprise computing program codes for:

B9) generating a subsequent comparative color based on a subsequent comparative color selection input or a predetermined subsequent comparative color scheme; and B10) displaying said subsequent comparative color at a default subsequent comparative color position or a subsequent comparing position based on a subsequent comparative color positioning input received from said input devices, said subsequent comparative color is displayed interlaced with at least one of said first set of specimen colors at said subsequent comparing position;

wherein said subsequent comparative color and said first comparative color are displayed on said one or more display devices simultaneously or sequentially.

Similar to the first comparative color, the subsequent comparative color can be movable based on the input and can be interlaced with the specimen colors. In one example, the subsequent comparative color and the first comparative color can be displayed simultaneously at different positions interlacing with the same or different subset of the specimen colors. In another example, the subsequent comparative color and the first comparative color can be displayed sequentially at the same positions interlacing with the same subset of the specimen colors.

The predetermined first and the subsequent comparative color scheme can be the same or different depending on purposes. For example, when color match is the purpose, the comparative colors can select from similar colors. When color contrast or harmony is desired, the comparative colors can be select from contrast colors or harmony colors, respectively.

The display product can have one or more subsequent background colors. The subsequent background colors can be selected by the operator or generated by the computing device through a computing program. The aforementioned computing program product can further comprise computing program codes for:

B11) selecting one or more subsequent background colors to replace said first background color in said first display product to produce one or more subsequent display products; and B12) displaying said one or more subsequent display products, said first display product, or a combination thereof, on said one or more display devices simultaneously or sequentially.

Figure 1D:
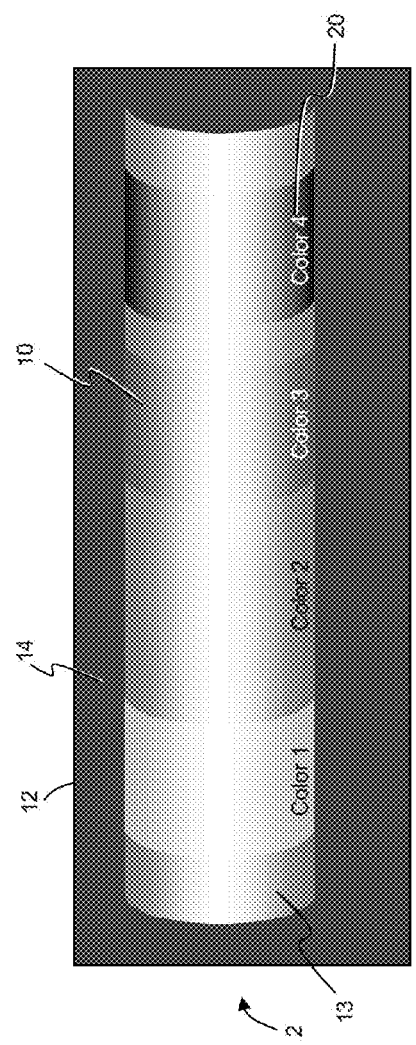
Figure 2E:
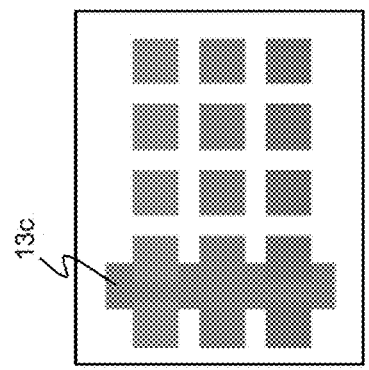
FIGS. 2A through 2F show further examples of display products having a set of specimen colors and a comparative color displayed on a first background color (FIGS. 2A, 2C and 2E) and a subsequent background color (FIGS. 2B, 2D and 2F); and examples of a comparative color interlaced horizontally (FIGS. 2C and 2D) and vertically (FIGS. 2E and 2F) with one or more of the specimen colors.
Figure 2F:
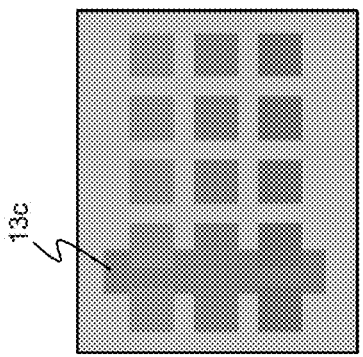
Figure 2C:
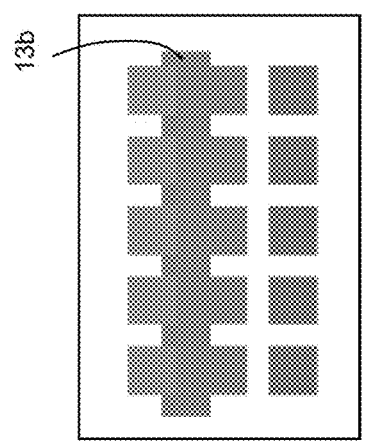
Figure 2D:
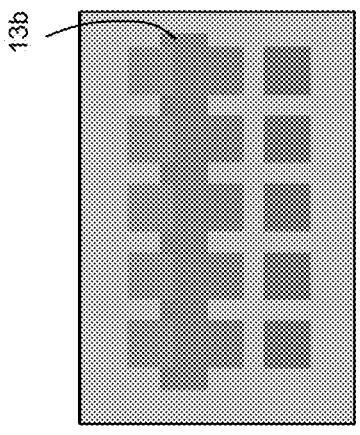
Figure 2A:
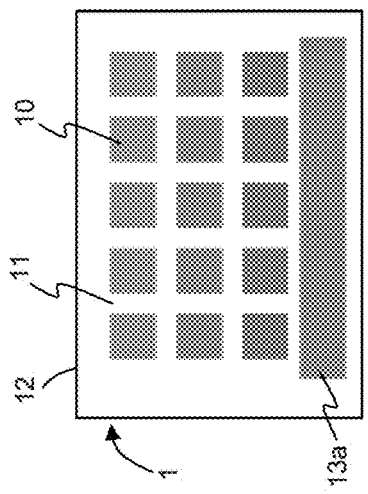
Figure 2B:
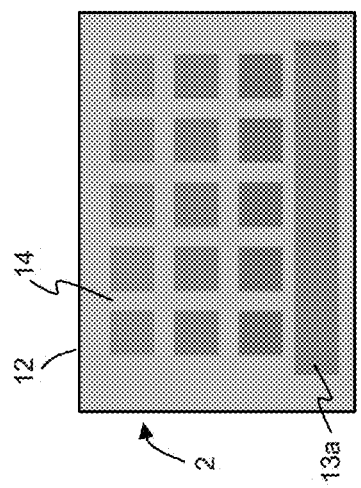

FIG. 1 shows examples of color display products (1 and 2) (FIGS. 1A-1D) having one or more specimen colors (10), a background area (12), a first background color (11), a comparative color (13), a subsequent background color (14), and one or more color identifiers or labels (20). The comparative color (13) can be moved at vertical directions (15), horizontal directions (16), or a combination thereof within the background area (12). The comparative color (13) can be interlaced with the specimen colors at a first comparing position (FIGS. 1A and 1B) or a second comparing position (FIGS. 1C and 1D).

FIG. 2 shows further examples of color display products (FIGS. 2A-2F) having a first background color (1) and a subsequent background color (2). The comparative color can be positioned at a default comparative color position (13a), a horizontal comparing position (13b), or a vertical comparing position (13c). The comparative color can be moved within the background area as described above.

The color display products can be displayed on the same or different display devices, simultaneously or sequentially.

Figure 3:
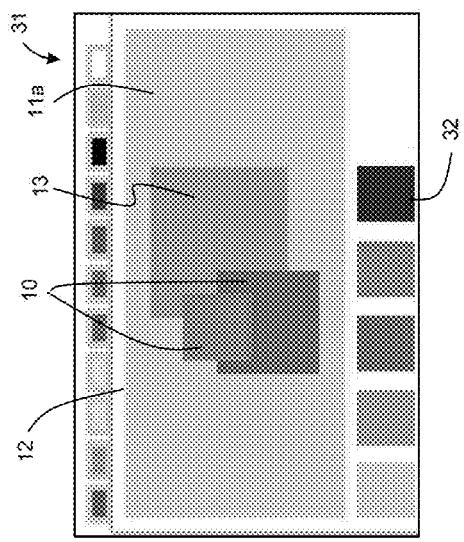
FIG. 3 shows a further example of a display product having a comparative color interlaced with a set of specimen colors and displayed over a background color.

FIG. 3 shows a further example of a further color display product (31) having two specimen colors (10), one comparative color (13) over a background color (11a) within the background area (12). The further color display product (31) can comprise one or more customized colors (32).

Figure 4B:
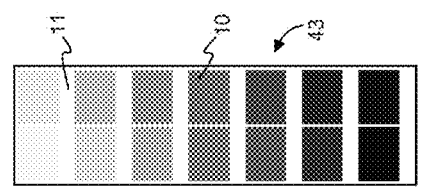
FIGS. 4A through 4C show examples of display products having two strips of colors (FIGS. 4A and 4B) and 6 strips of colors (FIG. 4B) displayed on gradient background colors (FIGS. 4A and 4C) or a single background color (FIG. 4B).
Figure 4A:
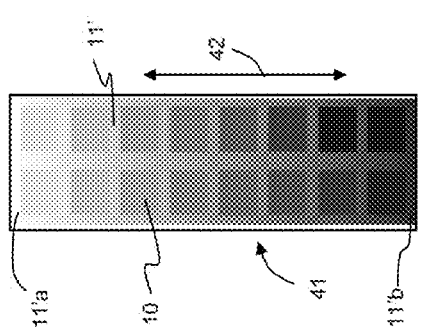
Figure 4C:
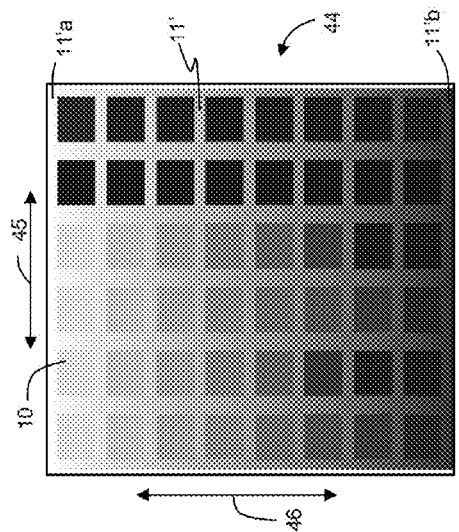

FIG. 4 shows even further examples of color display products in color strips (FIGS. 4A-4C). The first color display product in color strips (41) can have specimen colors (10) arranged in two strips over a first gradient background color (11') that has a first light color (11'a) and a first dark color (11'b). The background color can gradually change from the first light color (11'a) to the first dark color (11'b) in vertical directions (42). The second color display product in color strips (43) can have a solid background color (11). The third color display product in color strips (44) can have a plurality of specimen colors arranged in multiple strips over the gradient background color (11'). The background color can gradually change from the first light color (11'a) to the first dark color (11'b) in horizontal directions (45) or vertical directions (46).

Based on comparisons of colors, one or more target colors can be selected by the operator or by the computing program product. The aforementioned computing program product can further comprise computing program codes for:

B13) selecting a target color from the specimen colors based on a target color selection input received from the input devices or a predetermined target color selection criterion;

B14) optionally, modifying the target color to generate a modified target color according to a color adjustment vector, a color modification model, a color modification input, or a combination thereof;

B15) displaying the modified target color when present on the one or more display devices;

B16) selecting an output color from the target color and the modified target color when present; and B17) outputting the output color to one or more output devices.

The target color can be selected based on the purpose. In one example, when one or more matching colors are desired, the color 2 in FIGS. 1A-1D can be selected. In another example, when one or more contrast colors are desired, the color 1 or color 4 in FIGS. 1A-1D can be selected. The operator can enter the selection from the input devices, such as using a mouse click to point to a color area displayed on a computer screen represent a specimen color to select that color as the target color.

Selection of the one or more target colors can also be done by predetermining a set of target color selection criteria, such as $\Delta E$, $\Delta E^*_{ab}$ defined in CIELAB, $\Delta E^*_{94}$ defined in CIE 1994 ($\Delta L^* \Delta C^*_{ab}$ $\Delta H^*_{ab}$) color-difference equation, the color differences ($\Delta E$) based on BFD, CMC, CIE 1976, CIE 2000 (also referred to as CIEDE 2000), a color difference index (CDI) value for multiple viewing angles or illumination angles, or any other color difference definitions or equations known to or developed by those skilled in the art, for color differences between the specimen colors and the comparative colors. In one example, one or more specimen colors having $\Delta E^*_{ab}$ values less than a predetermined value can be automatically selected as the target colors when similar colors are desired. In another example, one or more specimen colors having $\Delta E^*_{ab}$ values greater than a predetermined value can be automatically selected as the target colors when contrast or dissimilar colors are desired.

The one or more target colors can be outputted to one or more output devices. The one or more output devices can be selected from one or more printers, the aforementioned one or more display devices same or different from the aforementioned display devices, one or more computing devices same or different from the aforementioned computing device, one or more databases same or different from the color database, one or more digital file storage devices, one or more computing programs, or a combination thereof.

The target color can be outputted as target color characteristics such as L*a*b* values, R,G,B values, or any other color values that can define the target color, a target color formula interrelated with the target color, target color identifier such as a target color name or a target color code, target color computer codes or a target color digital data file that are associated with the target color characteristics, or a combination thereof. The target color can also be outputted as other forms of data or items, such as a color print, a colored fabric, a colored article, or a combination thereof. The target color can be outputted in a form suitable for intended purpose. For example when the target color is to be printed from a CMYK color printer, the target color can be outputted or converted to a form suitable for the printer.

When the specimen colors, the comparative colors, the target colors, or a combination thereof, are displayed on a digital display, a link or a clickable selection can be configured with each of the aforementioned colors. When the aforementioned colors or a combination thereof are displayed on color chips or printed display, an identifier or code can be associated with each of the aforementioned colors.

In the aforementioned system, the one or more target colors can be modified or adjusted manually by an operator, automatically through a computing program, or a combination thereof. The target color can be modified according to a linear vector or function, or a non-linear vector or function, or a combination thereof. Examples of those vectors or functions can include the ones disclosed in U.S. Pat. No. 3,690,771 and WO2008/150378A1. Commercial computing systems, such as ColorNet® System available from E.I. du Pont de Nemours and Company, Wilmington, Del., USA, under respective trademark or registered trademarks, can be suitable.

The aforementioned computing program product can further comprise computing program codes for:

B18) generating a modified color formula based on the modified target color when present.

The color formula can comprise descriptions, compositions, ratios of compositions, such as names or descriptions of dyes, pigments or effect pigments when present, and other necessary components or ingredients. Examples of the color formula can include processes and quantities for jetting inks of CMYK colors to form the target color on paper and color formulas for mixing dyes and pigments to form colored coating compositions. Color formulas can be developed based on the target color.

The computing program product can further comprise computing program codes for:

B19) outputting the modified color formula when present to the one or more output devices.

Any of the aforementioned output devices can be suitable.

The system can further comprise:

A6) a subsequent computing program product stored on a subsequent digital storage medium functionally coupled to the computing device, the subsequent computing program product comprises subsequent computing program codes for:

C1) receiving the output color;

C2) receiving article data comprising shaping data, and optionally, environment data, of an article;

C3) generating one or more viewing angle data, one or more illumination angle data, optionally one or more environmental effect data, or a combination thereof, based on the article data;

C4) generating an article color image having article color display values based on the output color, the one or more viewing angle data, the one or more illumination angle data, optionally one or more environmental effect data, or a combination thereof; and C5) displaying the article color image on the one or more display devices;

wherein the subsequent computing program product can be a stand-alone product or a part of the computing program product; and the subsequent digital storage medium can be the same or different from the first digital storage medium.

The output color can be the target color or the modified target color and can be received into the aforementioned computing program product in digital data forms, such as a color data file comprising the color characteristics of the target color. The article data can be received from one or more of the aforementioned input devices or retrieved from a database, such as the aforementioned color database or a second database. The shaping data, and optionally the environment data can be used to generate the viewing angle, the illumination angle data. In one example, the article can be a vehicle. A plurality of viewing angle data can be generated based on the shape of the vehicle. In another example, one or more lighting devices can be positioned around the vehicle to illuminate the vehicle. Illumination angle data can be generated based on positions of the lighting devices relative to the vehicle. Methods and systems described in U.S. Pat. Nos. 7,743,055, 7,747,615 and 7,639,255 can be suitable for generating and display the article color image. The process described in U.S. Pat. No. 7,991,596 for generating and display digital images via bidirectional reflectance distribution function (BRDF) can also be suitable. The article color image generated based on viewing angle data, illumination angle data, or a combination thereof can be particularly useful for displaying the target color having appearance or color visual effects imparted by effect pigments, such as a color from a coating having metallic pigments.

Figure 5:
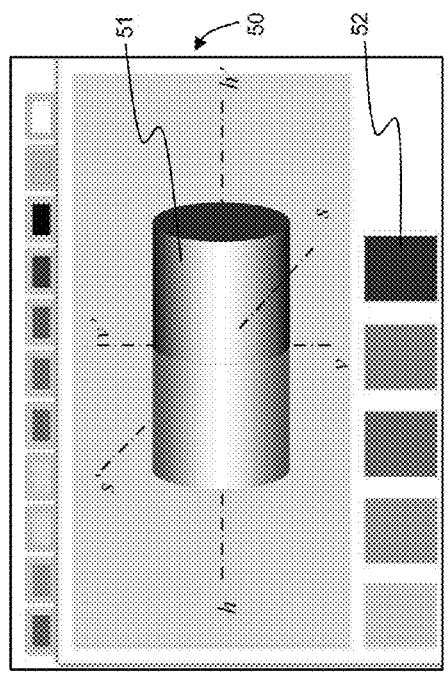
FIG. 5 shows an exemplary embodiment of a customized color display having one or more articles representing one or more viewing angle or illumination angles of one or more selected colors.
Figure 6:
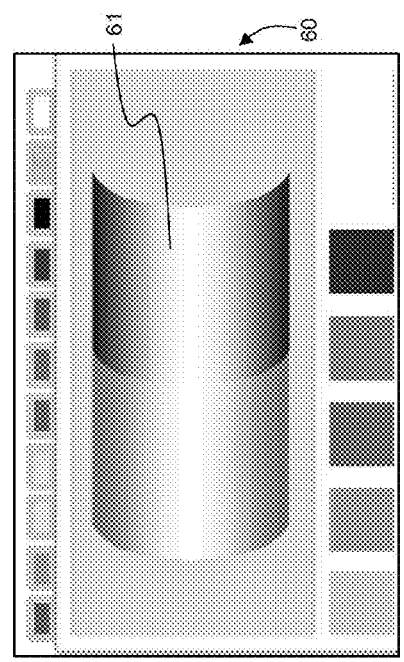
FIG. 6 shows an example of a customized color display having one or more articles representing one or more viewing angle or illumination angles of one or more selected colors.

FIGS. 5 and 6 show examples of the article color images. One or more target colors can be displayed over a cylindrical article (51) (FIG. 5) or a curved surface (61) (FIG. 6). The article color image can move or rotate along any of the vertical axis (v-v'), horizontal axis (h-h'), front-back axis (s-s'), or a combination thereof (FIG. 5). Examples of the article can include a vehicle, a piece of sport equipment, an airplane, a boat, or a piece of electronic appliance.

In the aforementioned system, the computing program product can further comprise computing program codes for:

B20) generating a customized display product comprising the first display product and one or more customized colors; and B21) displaying the customized display product on the one or more display devices;

wherein the one or more customized colors are selected based on a customized color selection input or history records of the use of the system.

Figure 7:
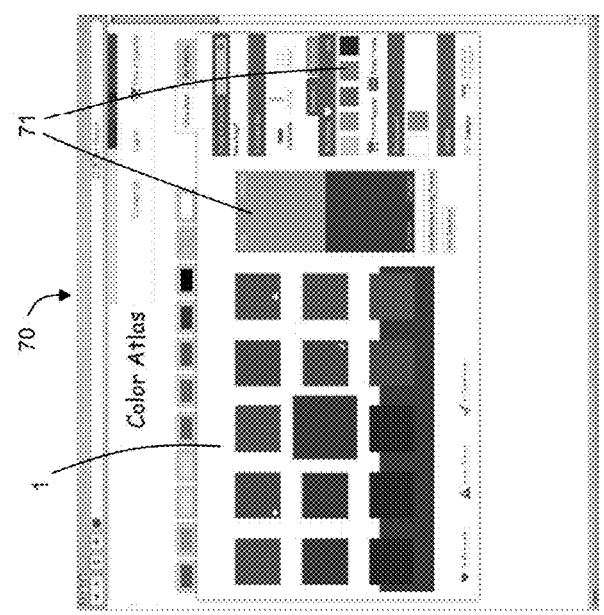
FIG. 7 shows a further example of a customized color display having one or more articles representing one or more viewing angles or illumination angles of one or more selected colors.

Examples of customized display can include the customized displays shown in FIGS. 3, 5, 6, and 7 (31, 50, 60, and 70) having one or more customized colors (32, 52, and 71). The customized display can also have one or more of the aforementioned display product, such as the display product (1) (FIG. 7).

For selecting colors for vehicles, such as cars or trucks, at least one of the color identifiers can comprise vehicle identification number (VIN) of a vehicle, part of the VIN, color code of the vehicle, production year of the vehicle, or a combination thereof.

In the system disclosed herein, the one or more display devices can further comprise a display medium selected from paper, plastic, glass, metal, wood, natural polymers, synthetic polymers, or a combination thereof. The display products can be displayed on the display medium, at least one of the digital display devices, or a combination thereof.

The system can further comprise: A7) a chip display product displaying a set of chip colors over a chip background color on the display medium; wherein the chip colors can be the same or different from the first set of specimen colors; and the chip background color can be the same or different from the first background color. In one example, the chip display product can display a set of chip colors on paper or plastic cards (80, 81, and 82) (FIG. 8A).

Any of the aforementioned specimen colors can comprise one or more appearance effects produced from one or more effect pigments. Such appearance effects can include sparkle, flop, texture, or a combination thereof.

The system can further comprise one or more mixing devices for producing color products by mixing color components based on the color formulas. In one example, a coating composition having the output color can be produced by mixing coating components comprising color components based on an output coating formula. In another example, a color print having a selected output color can be produced by jetting or transferring colored inks or ink components onto paper or other media based on a color printing formula. In yet another example, a piece of fabric having desired output color can be produced by dying the fabric using a colored mixture based on the output color formula.

This disclosure is also directed to a color display kit. The color display kit can comprise:

i) one or more digital data storage media comprising computing codes for:

ia) a color database, access connection data for accessing the color database, or a combination thereof, the color database comprises a plurality of interrelated color characteristics and color identifiers; and ib) a computing program product that comprises computing program codes for:

D1) receiving a color selection input from one or more input devices for selecting a first set of specimen colors;

D2) retrieving from the color database first color characteristics based on the first set of specimen colors;

D3) generating a first background color based on a first background selection input or based on a predetermined first background color scheme;

D4) generating a first display pattern comprising positioning data for positioning the first background color and each of the first set of specimen colors over the first background color within a first background area;

D5) generating first color display values of a first display product, the first color display values are generated based on at least the first color characteristics, the first display pattern, and the first background color; and D6) displaying the first display product on one or more display devices based on the color display values.

The computing program product can further comprise aforementioned computing program codes for automatically selecting all of the first set of specimen colors based on predetermined selection criteria if the color selection input is only selecting part of the first set of specimen colors.

The aforementioned first background color can be suitable. The first color display values can comprise R,G,B color values based on the first color characteristics and the first background color.

The kit can be installed on a computing device. Any of the aforementioned computing devices can be suitable. Additional devices such as the aforementioned one or more display devices, input devices, output devices can be needed. Wired or wireless network connections can be needed.

The color database can be stored on the digital storage media and installed on the computing device. The color database can also reside on a remote computer server. The access connection data can comprise a link to access the color database through a network connection selected from a wired connection, a wireless connection, or a combination thereof, to the remote computer server when the color database or a part thereof resides in the remote computer server. The access connection data can further comprise computing program codes for an authentication process such as requiring a user ID and password, or other authentication or security measurements. When installed on a computing device, the computing device can be configured to automatically connect the remote server and the color database or a part thereof, or require additional manual connection steps, such as one or more authentication steps.

The computing program product of the color display kit can further comprise computing program codes for:

D7) generating a first comparative color based on a first comparative color selection input or a predetermined first comparative color scheme; and D8) displaying the first comparative color at a default first comparative color position or a first comparing position based on a first comparative color positioning input received from the input devices, the first comparative color is displayed interlaced with at least one of the first set of specimen colors over the first background color at the first comparing position within the first background area.

The computing program product of the color display kit can further comprise computing program codes for:

D9) generating a subsequent comparative color based on a subsequent comparative color selection input or a predetermined subsequent comparative color scheme; and D10) displaying the subsequent comparative color at a default subsequent comparative color position or a subsequent comparing position based on a subsequent comparative color positioning input received from the input devices, the subsequent comparative color is displayed interlaced with at least one of the first set of specimen colors at the subsequent comparing position;

wherein the subsequent comparative color and the first comparative color are displayed on the one or more display devices simultaneously or sequentially.

The computing program product of the color display kit can further comprise computing program codes for:

D11) generating one or more subsequent background colors to replace the first background color in the first display product to produce one or more subsequent display products; and D12) displaying the one or more subsequent display products, the first display product, or a combination thereof, on the one or more display devices simultaneously or sequentially;

wherein the subsequent background color is different from the first set of specimen colors.

The aforementioned first and subsequent comparative colors, the first and subsequent background colors can be suitable.

The computing program product of the color display kit can further comprise computing program codes for:

D13) receiving a color selection input from the input devices or a predetermined target color selection criterion for selecting a target color from the specimen colors;

D14) optionally, receiving a color modification input or automatically modifying the target color to generate a modified target color according to a color adjustment vector, a color modification model, or a combination thereof;

D15) displaying the modified target color when present on the one or more display devices;

D16) receiving an output selection from the input devices for selecting an output color from the target color and the modified target color when present; and D17) outputting the output color to one or more output devices.

The computing program product of the color display kit can further comprise computing program codes for: D18) generating a modified color formula based on the modified target color when present.

The computing program product of the color display kit can even further comprise computing program codes for: D19) outputting the modified color formula when present to the one or more output devices.

Any of the aforementioned output devices can be suitable. The one or more digital data storage media of the color display kit can further comprise:

ic) a subsequent computing program product that comprises subsequent computing program codes for:

C1) receiving the output color;

C2) receiving article data comprising shaping data, and optionally, environment data, of an article;

C3) generating one or more viewing angle data, one or more illumination angle data, optionally one or more environmental effect data, or a combination thereof, based on the article data;

C4) generating an article color image having article color display values based on the output color, the one or more viewing angle data, the one or more illumination angle data, optionally one or more environmental effect data, or a combination thereof; and C5) displaying the article color image on the one or more display devices;

wherein the subsequent computing program product is a stand-alone product or part of the computing program product.

The computing program product of the color display kit can further comprise computing program codes for:

D20) generating a customized display product comprising the first display product and one or more customized colors; and D21) displaying the customized display product on at least one of the one or more display devices;

wherein the one or more customized colors are selected based on a customized color selection input or history records of the use of the system.

The aforementioned article color image, processes and systems can be suitable.

As mentioned above, the color identifiers can comprise vehicle identification number (VIN) of a vehicle, part of the VIN, color code of the vehicle, production year of the vehicle, or a combination thereof. The color database can further comprise a plurality of color formulas interrelated to the plurality of color characteristics and color identifiers.

The color display kit can further comprise:

ii) one or more color chips each having one or more chip colors displayed over a chip background color on a display medium selected from paper, plastic, glass, metal, wood, natural polymers, synthetic polymers, or a combination thereof;

wherein the one or more chip colors can be same or different from the first set of specimen colors; and the chip background color can be the same or different from the first background color.

Each of the one or more color chips can comprise a first set of chip color display and a second set of chip color display, the first set of chip color display comprises a plurality of different first chip colors having a first color appearance effect selected from a first lightness, first hue, first chroma, first sparkle, first texture, or a combination thereof, the second set of chip color display can comprise a plurality of different second chip colors having a second color appearance effect selected from a second lightness, second hue, second chroma, second sparkle, second texture, or a combination thereof. The first and the second chip colors can be the same or different, the first color appearance effect and the second color appearance effect can be different. The one or more color chips can be arranged so that only one of the first set of chip color display and the second set of chip color display can be visibly displayed.

The color display kit can further comprise:

iii) a computing device for functionally accessing the computing codes, the computing program codes, or a combination thereof; and iv) one or more digital display devices being coupled to the computing device for displaying the first display product.

The computing device, the display devices, or a combination thereof, can also be provided by a user. As described above, the color database, or access connection data, the computing program product can be installed on the computing device.

Figure 8B:
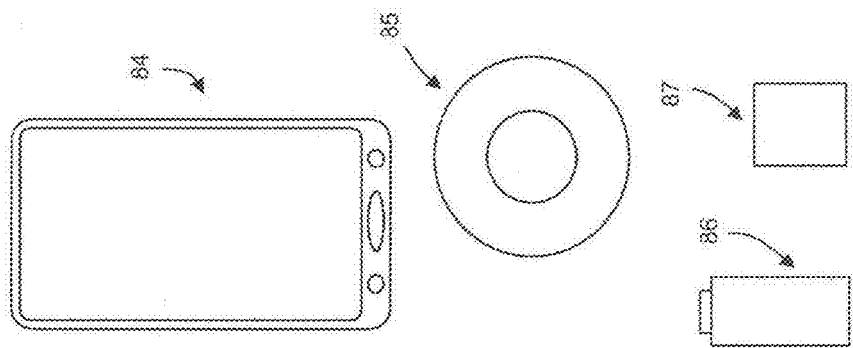
FIGS. 8A and 8B show another example of a customized display.
Figure 8A:
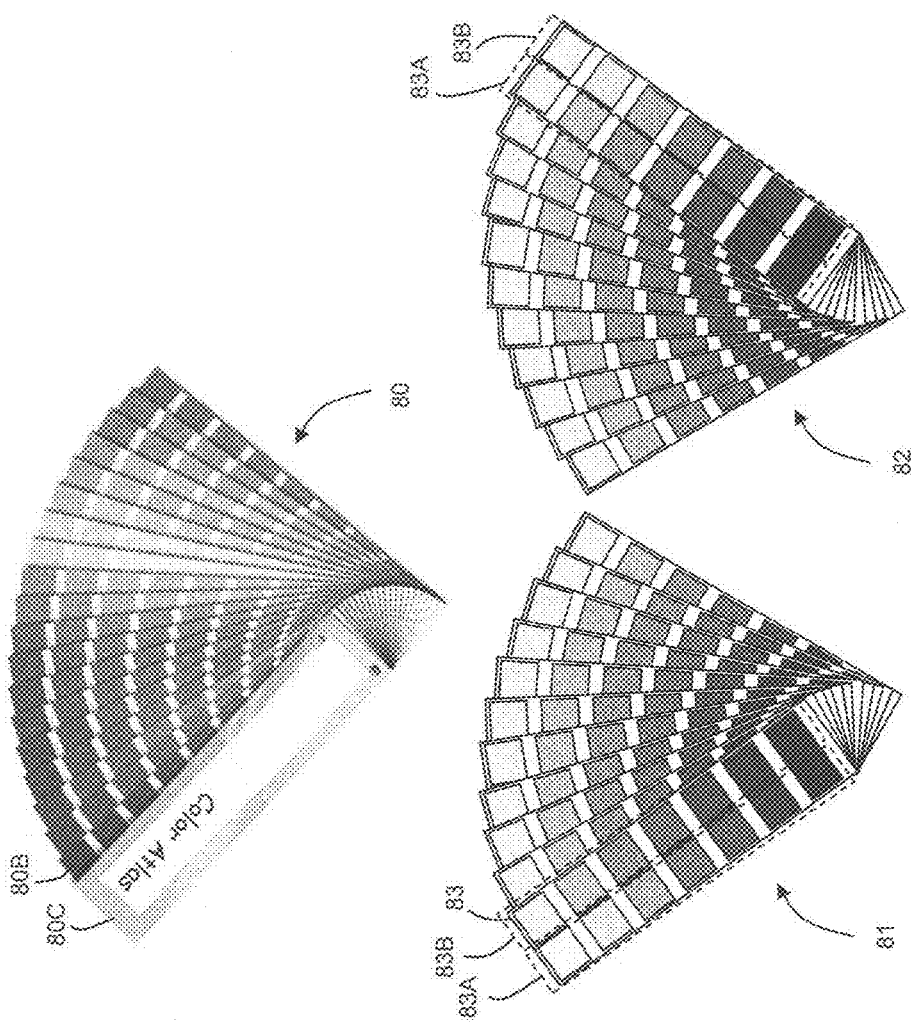

FIGS. 8A and 8B show examples of the color display kit of this disclosure. In one example the kit can comprise one of the chip decks (80, 81, and 82) having multiple color chips (80 and 83), respectively, and one or more of the digital data storage media, such as a smart phone or PDA (personal digital assistant) (84), a compact disc or DVD (85), a flash memory device such as a USB drive (86) or SD card (87), or a combination thereof. In another example, the color display kit can comprise only the smart phone (84) that can store the computing program product, the color database or the access connection data; and display colors on its touch screen that can also function as an input device. The smart phone can further provide wireless connections to one or more remote computer servers. The smart phone can also function as the computing device. In another example, the color display kit can be included in the aforementioned system.

As shown in FIG. 8A, each of the color chips (83) can comprise two sets of chip colors, such as a first set of chip color display (83A) and the second set of chip color display (83B). When the chip deck is fanned out towards left such as shown in the left fanned deck (81), only the second set of chip color display (83B) can be arranged to be visibly displayed. When the chip deck is fanned out towards right such as shown in the right fanned deck (82), only the first set of chip color display (83A) can be arranged to be visibly displayed. A cover (80C) can be included for the display to cover the colors that are to be covered.

This disclosure is further directed to a method for displaying and designing one or more colors. The method can comprise the steps of:

E1) selecting a first set of specimen colors;

E2) obtaining first color characteristics for each of the first set of specimen colors;

E3) providing a first background color;

E4) providing a first comparative color;

E5) generating a first display pattern comprising positioning data for positioning the first background color, each of the first set of specimen colors, the first comparative color, over the first background color within a first background area, the first comparative color is displayed interlaced with at least one of the first set of specimen colors over the first background color at a first comparing position within the first background area;

E6) generating first color display values of the first display product, the first color display values are generated at least based on the first color characteristics, the first display pattern, the first comparative color and the first background color; and E7) displaying the first display product on the one or more display devices based on the first color display values;

wherein the one or more display devices comprise one or more digital display devices.

The aforementioned first background color can be suitable. The comparative color can be selected from the first set of specimen colors. The one or more display devices can further comprise one or more display media selected from paper, plastic, glass, metal, wood, natural polymers, synthetic polymers, or a combination thereof. The first display product can be displayed on the digital display device and the first color display values can comprise R,G,B color values based on the first color characteristics, the first background color and the first comparative color.

The method can further comprise the steps of:

E8) providing a subsequent comparative color; and

E9) displaying the subsequent comparative color at a subsequent comparing position, the subsequent comparative color is displayed interlaced with at least one of the first set of specimen colors at the subsequent comparing position;

wherein the subsequent comparative color and the first comparative color are displayed on the one or more display devices simultaneously or sequentially.

The method can further comprise the steps of:

E10) providing one or more subsequent background colors to replace the first background color in the first display product to produce one or more subsequent display products; and E11) displaying the one or more subsequent display products, the first display product, or a combination thereof, on the one or more display devices simultaneously or sequentially.

The aforementioned subsequent background colors and the subsequent comparative colors can be suitable.

The method can further comprise the steps of:

E12) selecting a target color from the specimen colors;

E13) optionally, modifying the target color to generate a modified target color according to a color adjustment vector, a color modification model, a color modification input, or a combination thereof;

E14) displaying the modified target color when present on the one or more display devices;

E15) selecting an output color from the target color and the modified target color when present; and E16) outputting the output color to one or more output devices.

The method can further comprise the steps of:

E17) generating a modified color formula based on the modified target color when present.

The method can further comprise the steps of:

E18) outputting the modified color formula when present to the one or more output devices.

Any of the aforementioned target color, modified target color, modified target color formula, and output devices can be suitable.

The method can further comprise the steps of:

E19) obtaining article data comprising shaping data, and optionally, environment data, of an article;

E20) generating one or more viewing angle data, one or more illumination angle data, optionally one or more environmental effect data, or a combination thereof, based on the article data;

E21) generating an article color image having article color display values based on the output color, the one or more viewing angle data, the one or more illumination angle data, optionally one or more environmental effect data, or a combination thereof; and E22) displaying the article color image on the one or more display devices.

The article color image can be displayed on the digital display device and the article color display values can comprise R,G,B color values based on the output color, the one or more viewing angle data, the one or more illumination angle data, optionally one or more environmental effect data, or a combination thereof.

The aforementioned system and computing program products can be suitable for implementing the method.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for displaying and producing one or more colors, the method comprising the steps of:

selecting a first set of specimen colors;

obtaining first color characteristics for each of the first set of specimen colors;

providing a first background color;

generating a first comparative color by a computing device through a computing program;

generating a first display pattern by the computing device through the computing program, the first display pattern comprising positioning data for positioning the first background color, each of the first set of specimen colors, and the first comparative color over the first background color within a first background area, wherein the first comparative color is displayed in contact with each of the first set of specimen colors over the first background color at a first comparing position within the first background area;

generating first color display values of the first display product by the computing device through the computing program, wherein the first color display values are generated based on the first color characteristics, the first display pattern, the first comparative color and the first background color; and displaying the first display product on a digital display device based on the first color display values.

2. The method of claim 1, wherein the first background color is a first gradient color having first gradient color values varying continuously or incrementally from a first light color value to a first dark color value, wherein the first light color and the first dark color are different.

3. The method of claim 1, wherein generating the first comparative color comprises generating the first comparative color based on a predetermined first comparative color scheme.

4. The method of claim 1, further comprising displaying the first display product based on the first color display values on display media selected from paper, plastic, glass, metal, wood, natural polymers, synthetic polymers, or a combination thereof.

5. The method of claim 1, wherein the first display product is displayed on the digital display device and the first color display values comprise R,G,B color values based on the first color characteristics, the first background color and the first comparative color.

6. The method of claim 1 further comprising the steps of:

providing a subsequent comparative color; and displaying the subsequent comparative color at a subsequent comparing position, wherein the subsequent comparative color is displayed in contact with each of the first set of specimen colors at the subsequent comparing position;

wherein the subsequent comparative color and the first comparative color are displayed on the display device simultaneously or sequentially.

7. The method of claim 1 further comprising the steps of:
providing a subsequent background color to replace the first background color in the first display product to produce a subsequent display product; and
displaying the subsequent display product, the first display product, or a combination thereof, on the display device simultaneously or sequentially.

8. The method of claim 1 further comprising the steps of:
selecting a target color from the specimen colors;
modifying the target color to generate a modified target color according to a color adjustment vector, a color modification model, a color modification input, or a combination thereof;
displaying the modified target color when present on the display device;
selecting an output color from the target color and the modified target color when present; and
outputting the output color to an output device.

9. The method of claim 8 further comprising the steps of generating a modified color formula based on the modified target color when present.

10. The method of claim 9 further comprising the steps of outputting the modified color formula when present to the output device.

11. The method of claim 8 further comprising the steps of:
obtaining article data comprising shaping data and environment data of an article;
generating viewing angle data, illumination angle data, environmental effect data, or a combination thereof, based on the article data;
generating an article color image having article color display values based on the output color, the viewing angle data, the illumination angle data, the environmental effect data, or a combination thereof; and
displaying the article color image on the display device.

12. The method of claim 11, wherein the article color image is displayed on the digital display device and the article color display values comprise R,G,B color values based on the output color, the viewing angle data, the illumination angle data, the environmental effect data, or a combination thereof.

13. A system for displaying and producing one or more colors, the system comprising:
a color database including a plurality of interrelated color characteristics for a first set of specimen colors and a first background color;
a color selecting input coupled to the color database for selecting the first set of specimen colors and the first background color;
a computing program product coupled to the color database and to the color selecting input for (a) generating first color display values of a first display product based on first color characteristics, a first background color, and a first background area, wherein the first background color is a first gradient color having first gradient color values varying continuously or incrementally from a first light color value to a first dark color value, wherein the first light color and the first dark color are different, and (b) generating a first display pattern including generating position data for positioning the first background color and each of the first specimen colors over the background color within the first background area; and
a display medium coupled to the computing program product for receiving first color display values and displaying (a) the first background color within the first background area and (b) the first set of specimen colors over the background color within the first background area.

14. The system of claim 13, wherein the computing program product is configured to generate a first comparative color, and wherein the first color display values of the first display product are based on the first comparative color.

15. The system of claim 13 wherein the computing program product or a portion of the computing program product resides on the remote computer server and is accessed from the computing program product via a network connection selected from a wired connection, a wireless connection, or a combination thereof.

16. The system of claim 13, wherein at least one of the color identifiers comprises a vehicle identification number (VIN), part of the VIN, color code of the vehicle, production year of the vehicle, or a combination thereof.

17. The system of claim 13 wherein the display medium displays a set of chip colors over a chip background color, wherein the chip colors are the same or different from the first set of specimen colors, and wherein the chip background color is the same or different from the first background color.

18. The system of claim 13, wherein the color database further comprises a plurality of color formulas interrelated to the plurality of color characteristics and color identifiers.

19. A method for displaying and producing one or more colors, the method comprising the steps of:
selecting a first set of specimen colors;
obtaining first color characteristics for each of the first set of specimen colors;
providing a first background color, wherein the first background color is a first gradient color having first gradient color values varying continuously or incrementally from a first light color value to a first dark color value, wherein the first light color and the first dark color are different;
providing a first comparative color;
generating a first display pattern comprising positioning data for positioning the first background color, each of the first set of specimen colors, the first comparative color, over the first background color within a first background area, the first comparative color is displayed interlaced with at least one of the first set of specimen colors over the first background color at a first comparing position within the first background area;
generating first color display values of the first display product, the first color display values are generated based on the first color characteristics, the first display pattern, the first comparative color and the first background color; and
displaying the first display product on a digital display device based on the first color display values.

20. The method of claim 1 further comprising selecting a second set of specimen colors, wherein the first display pattern comprises positioning data for positioning each of the second set of specimen colors over the first background color, wherein the first comparative color is movable into contact with each of the second set of specimen colors.

* * * * *